United States Patent
Herbeth et al.

(10) Patent No.: US 9,217,503 B2
(45) Date of Patent: Dec. 22, 2015

(54) METHOD FOR OPERATING A VEHICLE DRIVE TRAIN HAVING AN INTERNAL COMBUSTION ENGINE

(75) Inventors: Valentine Herbeth, Friedrichshafen (DE); Jorg Arnold, Immenstaad (DE); Georg Mihatsch, Lindau (DE); Andreas Schmidt, Bavendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 723 days.

(21) Appl. No.: 13/521,749

(22) PCT Filed: Dec. 21, 2010

(86) PCT No.: PCT/EP2010/070383
§ 371 (c)(1),
(2), (4) Date: Jul. 12, 2012

(87) PCT Pub. No.: WO2011/085924
PCT Pub. Date: Jul. 21, 2011

(65) Prior Publication Data
US 2013/0035206 A1 Feb. 7, 2013

(30) Foreign Application Priority Data
Jan. 13, 2010 (DE) .......................... 10 2010 000 860

(51) Int. Cl.
*B60W 10/06* (2006.01)
*F16H 61/04* (2006.01)
(Continued)

(52) U.S. Cl.
CPC .............. *F16H 61/0403* (2013.01); *F16H 3/66* (2013.01); *F16H 61/686* (2013.01); *F16H 63/502* (2013.01); *F16H 2003/442* (2013.01); *F16H 2061/0474* (2013.01); *F16H 2061/0488* (2013.01); *F16H 2200/0065* (2013.01);
(Continued)

(58) Field of Classification Search
CPC .......................... F16H 61/0403; F16H 63/502
See application file for complete search history.

(56) References Cited

U.S. PATENT DOCUMENTS

| 5,417,627 | A | 5/1995 | Iizuka |
| 5,997,435 | A | 12/1999 | Back |

(Continued)

FOREIGN PATENT DOCUMENTS

| DE | 39 37 302 A1 | 5/1991 |
| DE | 43 02 247 A1 | 7/1993 |

(Continued)

*Primary Examiner* — Derek D Knight
(74) *Attorney, Agent, or Firm* — David & Bujold, P.L.L.C.; Michael J. Bujold

(57) ABSTRACT

A method of operating a vehicle drive-train comprising an internal combustion engine and a transmission system functionally connected to the internal combustion engine. The transmission has an interlocking shifting element, one shifting element half of which is functionally connected to the transmission input shaft while the other shifting element half is functionally connected to a transmission output shaft. Upon receipt of a command to change the transmission from a neutral position, in which a force flow through the transmission is interrupted, to an operating condition, in which the force flow through the transmission is produced, the interlocking shifting element is changed to an engaged operating condition. A speed difference between the shifting element halves is brought by varying the speed of the internal combustion engine into a speed difference window within which the interlocking shifting element can be changed to its engaged operating condition.

17 Claims, 3 Drawing Sheets

(51) Int. Cl.
*F16H 61/686* (2006.01)
*F16H 63/50* (2006.01)
*F16H 3/44* (2006.01)
*F16H 3/66* (2006.01)

(52) U.S. Cl.
CPC . *F16H2200/2012* (2013.01); *F16H 2200/2046* (2013.01); *F16H 2200/2064* (2013.01); *F16H 2200/2094* (2013.01); *Y10T 477/677* (2015.01)

(56) References Cited

U.S. PATENT DOCUMENTS

| | | | |
|---|---|---|---|
| 6,962,549 B2 * | 11/2005 | Dreibholz et al. | 475/284 |
| 7,951,043 B2 | 5/2011 | Reisch et al. | |
| 8,113,983 B2 | 2/2012 | Gumpoltsberger | |
| 8,187,151 B2 | 5/2012 | Gloge | |
| 8,840,517 B2 * | 9/2014 | Herbeth et al. | 475/275 |
| 2003/0054917 A1 * | 3/2003 | Raghavan et al. | 475/330 |
| 2007/0004555 A1 | 1/2007 | Berger | |
| 2007/0011507 A1 | 1/2007 | Rothman et al. | |
| 2011/0009229 A1 | 1/2011 | Bauknecht et al. | |
| 2012/0135838 A1 | 5/2012 | Cuppers et al. | |

FOREIGN PATENT DOCUMENTS

| | | | | |
|---|---|---|---|---|
| DE | 197 17 042 A1 | | 10/1998 | |
| DE | 102 44 023 A1 | | 4/2004 | |
| DE | 10 2005 013 137 A1 | | 9/2006 | |
| DE | 10 2007 011 507 A1 | | 9/2008 | |
| DE | 10 2007 022 776 A1 | | 12/2008 | |
| DE | 10 2008 000 429 A1 | | 9/2009 | |
| DE | 10 2008 040 665 A1 | | 6/2010 | |
| DE | 10 2009 028 305 A1 | | 2/2011 | |
| DE | 102010000859 A1 * | | 7/2011 | F16H 61/04 |
| EP | 0 992 706 A2 | | 4/2000 | |
| GB | 2 335 010 A | | 9/1999 | |
| WO | 2011/015466 A1 | | 2/2011 | |

* cited by examiner

METHOD FOR OPERATING A VEHICLE DRIVE TRAIN HAVING AN INTERNAL COMBUSTION ENGINE

This application is a National Stage completion of PCT/EP2010/070383 filed Dec. 21, 2010, which claims priority from German patent application serial no. 10 2010 000 860.5 filed Jan. 13, 2010.

FIELD OF THE INVENTION

The invention concerns a method for operating a vehicle drive-train that comprises an internal combustion engine.

BACKGROUND OF THE INVENTION

Vehicle drive-trains known from the prior art are usually formed in each case by an internal combustion engine and at least one transmission system arranged between the internal combustion engine and a drive output, by means of which gear ratios called for in each case depending on the operating situation can be obtained.

Such transmission systems, which are known per se and are made as automatic transmissions, are constructed with shifting elements for obtaining the various gear ratios, by means of the shifting elements, an applied torque can be transmitted by friction. When the engagement of a defined gear is called for, in each case at least one or more of the frictional shifting elements are disengaged from the force flow of a transmission while at least one or more other frictional shifting elements are engaged in the force flow of the transmission in order to obtain the gear required. During the engagement process of a frictional shifting element, no special synchronization measures are needed to ensure a desired level of shifting comfort, since a desired shifting comfort can be achieved with frictional shifting elements at defined contact pressures within a broad range of rotation speed differences.

As is known per se, since owing to drag losses that occur in the area of open frictional shifting elements such transmission systems can only be operated with inadequate efficiencies, certain frictional shifting elements are replaced by interlocking shifting elements. In automatic transmissions constructed with both frictional shifting elements and with at least one interlocking shifting element and with a corresponding gearset design, to implement a defined shift command at least one interlocking shifting element has to be engaged in a force flow of a transmission.

Disadvantageously, compared with frictional shifting elements, interlocking shifting elements with or without additionally designed synchronization means can only be shifted comfortably when their speed differences are very small, i.e. close to their synchronous speed, and accordingly the operation of a transmission constructed with at least one interlocking shifting element and designed as an automatic transmission is made undesirably more difficult, at least when carrying out some shifts in which an interlocking shifting element is involved. In some circumstances a shift called for can only be completed after the passage of an undesirably long shifting time, since before the interlocking shifting element involved in the required shift can be closed, the speed difference in the area of the interlocking shifting element has to be adjusted to a value at which the interlocking shifting element can be changed to its closed operating condition.

However, additional design measures for synchronizing interlocking shifting elements of transmission systems in order to carry out a required shift within an acceptable shifting time along with a high level of shifting comfort entail an undesirable increase both of production costs and of the fitting space occupied by the transmission.

From EP 00992706 A2 a vehicle transmission is known, which comprises both frictional and interlocking shifting elements. A speed difference between the shifting element halves of the interlocking shifting element is in this case reduced by changing the engine speed, to a point where the interlocking shifting element can be engaged. Disadvantageously, in this geared change-speed transmission no shifting element must be closed in the neutral condition, so that on shifting from neutral into a gear an interlocking shifting element must first be engaged, with prior adaptation of the engine speed, which is time-consuming.

SUMMARY OF THE INVENTION

Thus, the purpose of the present invention is to provide a method for operating a vehicle drive-train, by means of which gearshifts in transmission systems, in which at least one interlocking shifting element is involved, can be carried out within predefined shifting times with high shifting comfort, inexpensively, and without requiring additional fitting space for the transmission.

In the method according to the invention for operating a vehicle drive-train that comprises an internal combustion engine and a transmission functionally connected to the internal combustion engine in the area of a transmission input shaft, which is constructed with an interlocking shifting element one shifting element half of which is functionally connected to the transmission input shaft and the other shifting element half of which is functionally connected to a transmission output shaft, when a command occurs to change the transmission from a neutral operating condition in which a force flow in the area of the transmission is interrupted, to an operating condition in which the force flow is established in the area of the transmission, the interlocking shifting element is changed to its closed operating condition. To enable this, a rotational speed difference between the shifting element halves of the interlocking shifting element is brought, by varying the speed of the internal combustion engine, to within a speed difference window in which the interlocking shifting element can be changed to a closed operating condition.

In this way, when a shift has been called for, an interlocking shifting element of a transmission to be engaged, is synchronized before its closing process without additional designed synchronization devices, by appropriate operation of the internal combustion engine, inexpensively and with little space occupation by the transmission, so that gearshifts can be carried out with high shifting comfort along with acceptable shifting times.

According to the invention, a further interlocking shifting element is held in a closed condition while the transmission is in its neutral operating condition.

Since in the neutral operating condition of the transmission, even without a corresponding shift command the interlocking shifting element is already changed to and held in its closed operating condition, the transmission can be operated with a high level of spontaneity. The further shifting element is also involved in obtaining the gear for reverse driving, so that on arrival of a corresponding shift command, starting from the neutral operating condition a shift to the starting gear or first gear for forward driving or to the gear for reversing can in each case be carried out with a short shifting time.

In an advantageous variant of the method according to the invention, before the beginning of the motor action in the area of the internal combustion engine a friction shifting element to be engaged in the area of the transmission in order to produce the force connection is changed to a closed operating condition. This is necessary to be able to compute the speed difference at the interlocking shifting element.

In a further variant of the method according to the invention, if there is a positive speed difference between the speed of the shifting element half of the interlocking shifting element on the transmission input side and the speed of the shifting element half on the transmission output side thereof, this speed difference being outside the aforesaid speed difference window, then the speed of the internal combustion engine is reduced until the speed difference is within the speed difference window.

Moreover, in a further variant of the method according to the invention, if there is a negative speed difference between the speed of the shifting element half of the interlocking shifting element on the transmission input side and the speed of the shifting element half on the transmission output side thereof, this speed difference being outside the aforesaid speed difference window, then the speed of the internal combustion engine is increased until the speed difference is within the speed difference window.

Further advantages and advantageous features of the object according to the invention emerge from the example embodiment described below with reference to the drawings.

Both the characteristics indicated in the claims and those emerging from the example embodiment of the object according to the invention described below are in each case suitable, whether considered in isolation or in any desired combination with one another, as further developments of the object of the invention. In relation to such further development of the object of the invention, the respective combinations of features do not imply any limitation, but are only described as examples.

BRIEF DESCRIPTION OF THE DRAWINGS

The drawings show.

DETAILED DESCRIPTION OF THE PREFERRED EMBODIMENTS

Figure 1:
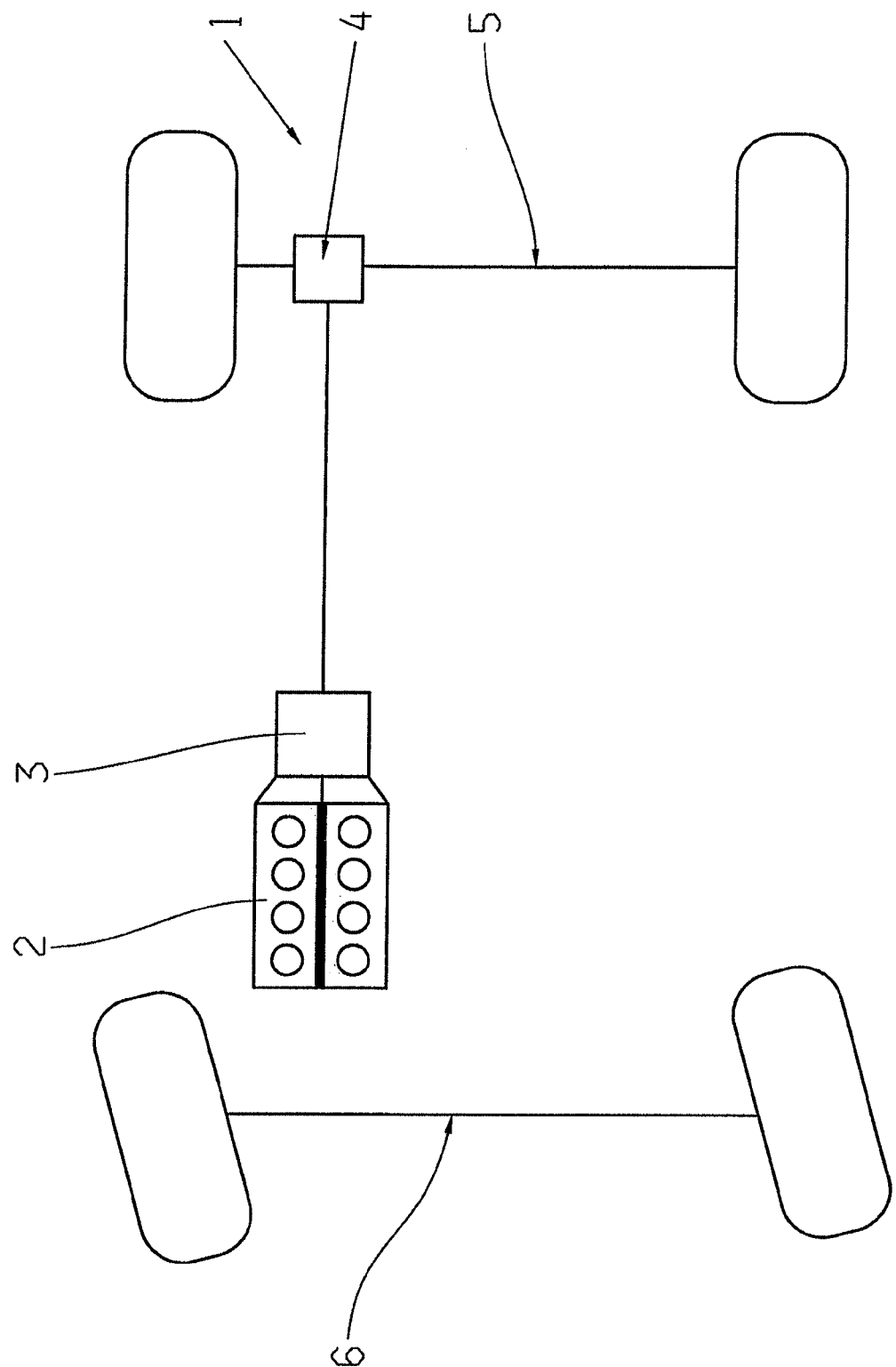
FIG. 1: A very schematic representation of a vehicle drive-train.

FIG. 1 shows a vehicle drive-train 1 with an internal combustion engine 2, a transmission 3, by means of which various gear ratios for forward and reverse driving can be obtained, and with a transfer transmission unit 4 and two vehicle axles 5, 6 such that in this case the vehicle axle 5 is the rear axle and the vehicle axle 6 is the front axle of the vehicle.

Figures 2, 3:
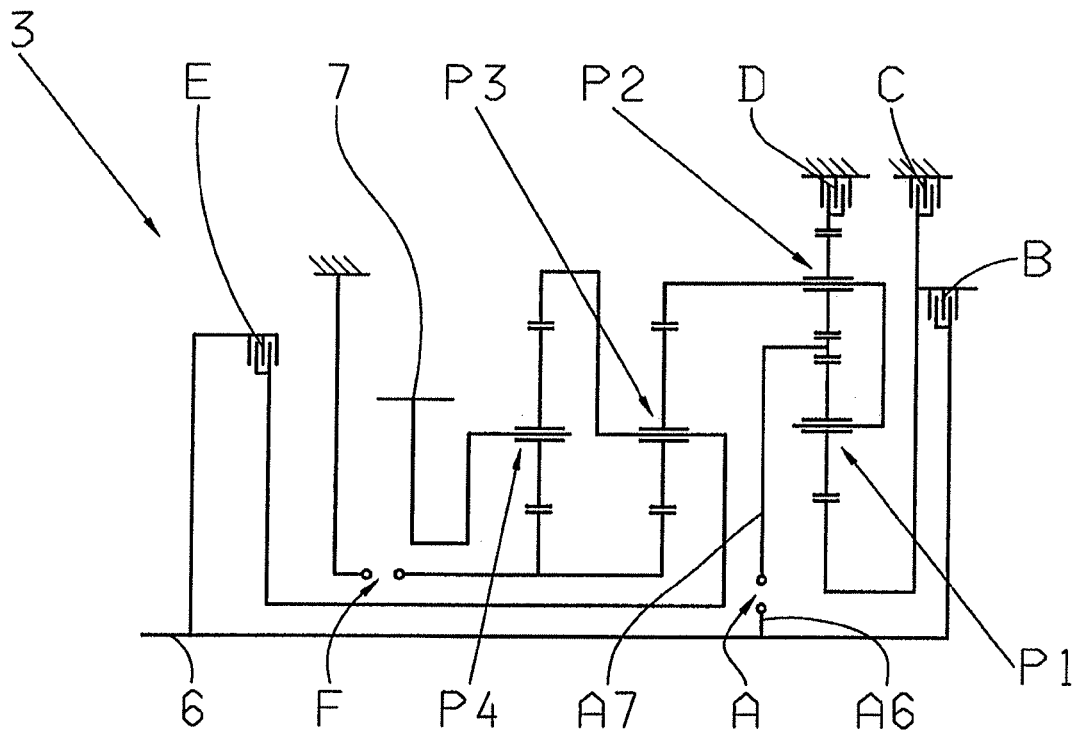
FIG. 2: A gear layout of a transmission system of the vehicle drive-train shown in FIG. 1.
FIG. 3: A shifting scheme of the transmission according to FIG. 2, in the form of a table.

A gear layout of the transmission 3 or a multi-step transmission, which is basically known from the unpublished German patent application DE 10 2008 000 429.4 by the present applicant, is represented in FIG. 2. The transmission 3 comprises a transmission input shaft 6 and a transmission output shaft 7, which when mounted in the vehicle is connected to the transfer transmission unit 4 whereas the transmission input shaft 6 is functionally connected to the internal combustion engine 2.

In addition the transmission 3 comprises four planetary gearsets P1 to P4, such that the first and second planetary gearsets P1, P2, which are preferably minus planetary gearsets, form a shiftable upstream gearset while the third and fourth planetary gearsets P3, P4 constitute the main transmission. Furthermore the transmission 3 comprises six shifting elements A to F, of which the shifting elements C, D and F are designed as brakes and the shifting elements A, B and E are designed as shifting clutches.

With the shifting elements A to F, nine forward gears "1" to "9" and one reverse "R" can be obtained, wherein up to the fourth gear ratio step "4", to obtain a gear in the transmission 3 or to produce a force flow therein, in each case three shifting elements at the same time must be changed to or kept in a closed operating condition.

In this case the shifting elements A and F are in the form of interlocking shifting elements in order, during the operation of the transmission 3, to reduce drag torques caused by open frictional shifting elements compared with transmissions in which only frictional shifting elements are present. Since in general interlocking shifting elements can only be changed from an open to a closed operating condition within a very narrow range of speed differences around their synchronous speed, the synchronization of an interlocking shifting element to be engaged without additional design measures is assisted by means of the method according to the invention described in more detail below, or achieved completely by the procedure according to the invention.

Figure 4:
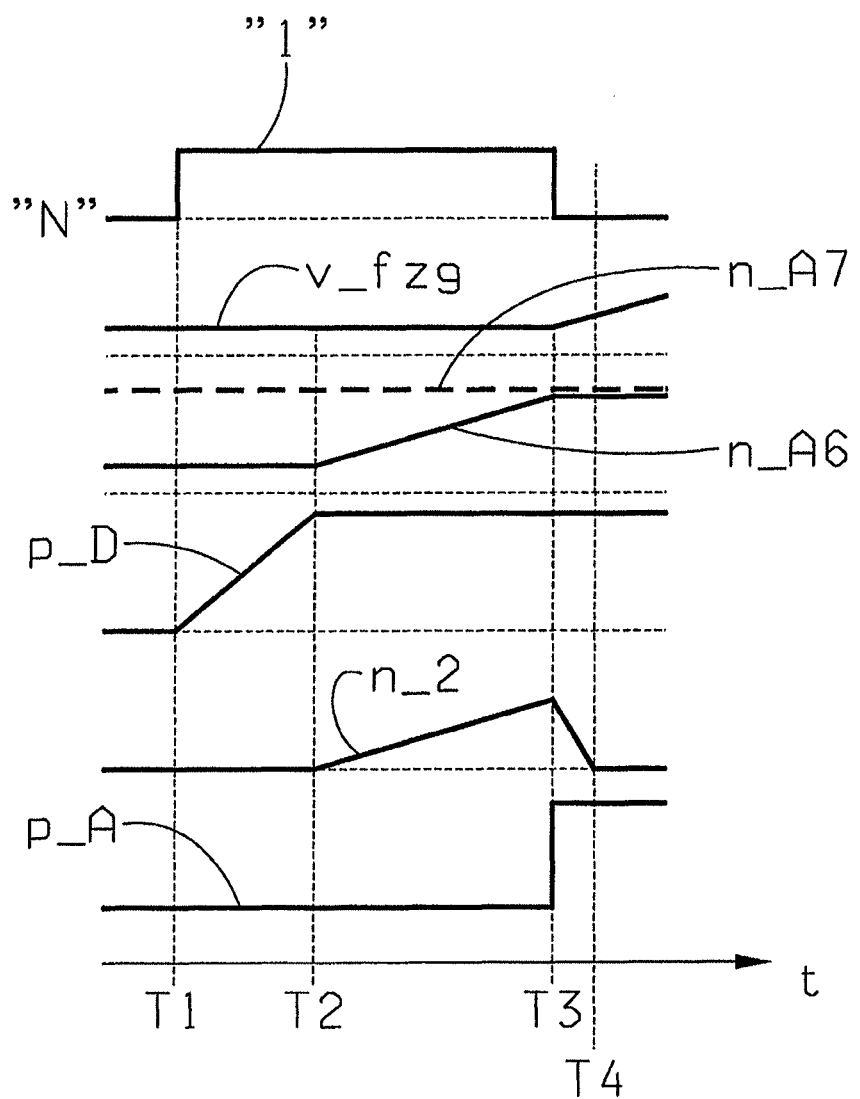
FIG. 4: A number of variations of various operating condition parameters of the vehicle drive-train in FIG. 1 while a gearshift called for is being carried out.

The mode of operation of a variant of the method according to the invention will be described more fully with reference to FIG. 4, which shows in detail the operating condition variations with time t of a number of operating parameters of the vehicle drive-train according to FIG. 1.

Up to a time point T1, the transmission 3 is in a so-termed neutral operating condition "N" in which essentially no drive torque can be transmitted from the transmission input shaft 6 in the direction of the transmission output shaft 7 or in the reverse direction, and in which only the interlocking shifting element F is in the closed operating condition, whereas the other shifting elements A to E are all in the open operating condition. At time T1 a shift command is sent to the transmission 3 for the engagement of the first gear "1" for forward driving, to obtain which, besides the shifting element F the frictional shifting element D and the interlocking shifting element A have to be changed to the closed operating condition.

Since in the neutral operating condition "N" of the transmission 3, even without a corresponding shift command the interlocking shifting element F is already changed to and held in its closed operating condition, the transmission 3 can be operated with a high level of spontaneity. The shifting element F is also involved in obtaining the gear "R" for reverse driving, so that on arrival of a corresponding shift command, starting from the neutral operating condition "N" a shift to the starting gear or first gear "1" for forward driving or to the gear "R" for reversing can in each case be carried out with a short shifting time. This results from the fact that in those cases, respectively only the shifting elements A and D or the shifting elements B and D have to be closed.

To carry out the shift command from the neutral operating condition "N" to the first gear "1" for forward driving, first the frictional shifting element D is closed by a ramp-shaped increase of an actuating pressure p_D of the shifting element D, which while the shifting element F is at the same time closed and also at the same time the further interlocking shifting element A is in its open operating condition, does not yet produce the force flow in the transmission 3. Thereafter, the interlocking shifting element A has to be engaged or changed to its closed operating condition. Once this has been done, the shifting process starting from the neutral operating condition "N" toward the first gear "1" is completed.

From a time T2 at which the frictional shifting element D is in its closed operating condition, it is determined by monitoring that a speed difference exists between a shifting element half A6 of the interlocking shifting element A which is functionally connected to the transmission input shaft 6, and a shifting element half A7 of the interlocking shifting element A which is coupled to the transmission output shaft 7, the difference being outside a speed difference window within which the interlocking shifting element can be changed to its closed operating condition within a predefined shifting time along with the required shifting comfort. For that reason, at time T2 in this case positive motor action is carried out such that the speed n_2 of the internal combustion engine 2 is increased in a ramp-shaped manner until a time T3. This reduces the difference between the speed n_A6 of the shifting element half A6 of the interlocking shifting element A on the transmission input side, which corresponds to the speed n_2 of the internal combustion engine 2 and to the speed of the transmission input shaft 6, and the speed n_A7 of the shifting element half A7 on the transmission output side.

At time T3 the speed difference between the shifting element halves A6 and A7 of the interlocking shifting element A is within the predefined speed difference window within which the interlocking shifting element A can be changed to a closed operating condition with the desired shifting comfort. Accordingly, an actuating pressure p_A or actuating force of the interlocking shifting element A is abruptly increased at time T3, and the interlocking shifting element A changes to its closed operating condition. Thereafter the positive motor action is discontinued, so that by a time T4, the speed n_2 of the internal combustion engine 2 falls at least approximately to the speed level at time T2.

From time T3, after which the force flow in the transmission 3 has been produced by engaging the first gear "1" for forward driving, the speed v_fzg of the vehicle, which was at least approximately constant and greater than zero between times T1 and T3, increases continuously if the road gradient is flat.

Depending on the application concerned, during the positive motor action the internal combustion engine 2 is operated under speed or torque regulation in order to achieve, in the area of the interlocking shifting element A, a so-termed zero-passage of the speed difference between the two shifting element halves A6 and A7 and to be able to change the interlocking shifting element A to its closed condition essentially in a synchronized operating state.

In the present case the transmission input speed is varied by changing the speed n_2 of the internal combustion engine 2, since the speed of the transmission input shaft 6 when the transmission input shaft 6 is directly coupled to an engine output shaft of the internal combustion engine 2 corresponds essentially to the speed n_2 of the internal combustion engine 2. If further elements such as a frictional shifting element operated with slip as a function of the operating condition, or a hydrodynamic converter, are connected intermediately, then in each case the transmission input speed represents a speed equivalent to the speed n_2 of the internal combustion engine 2.

INDEXES

1 Vehicle drive-train
2 Internal combustion engine
3 Transmission
4 Differential transmission unit
5 Vehicle axle
6 Transmission input shaft
7 Transmission output shaft
"1" to "9" Gear for forward driving
"N" Neutral operating condition of the transmission
"R" Gear for reverse driving
A to F Shifting element
A6 Shifting element half of the interlocking shifting element A on the transmission input side
A7 Shifting element half of the interlocking shifting element A on the transmission output side
n_2 Speed of the internal combustion engine
n_A6 Speed of the shifting element half on the transmission input side
n_A7 Speed of the shifting element half on the transmission output side
p_A Actuating pressure
p_D Actuating pressure
P1 to P4 Planetary gearset
t Time
T1 to T4 Discrete points in time
v_fzg Speed of the vehicle

The invention claimed is:

1. A method of operating a vehicle drive-train (1) which comprises an internal combustion engine (2) and a transmission (3) that is functionally connected to the internal combustion engine (2) by a transmission input shaft (6), the transmission having a first interlocking shifting element (A) which comprises a first interlocking shifting element half (A6), which is functionally connected to the transmission input shaft (6), the first interlocking shifting element (A) further comprising a second interlocking shifting element half (A7) which is functionally connected to a transmission output shaft (7), the method comprising the steps of:

maintaining a second interlocking shifting element (F) in an engaged condition when the transmission (3) is in a neutral operating condition ("N"); and upon receiving a command to change from the neutral operating condition ("N"), in which a force flow in the transmission (3) is interrupted, to an operating condition in which the force flow to an output of the transmission (3) is produced, initiating engagement of the first interlocking shifting element (A) by:

altering a rotational speed (n_A6) of the first interlocking shifting element half (A6) of the first interlocking shifting element (A) by varying a speed (n_2) of the internal combustion engine (2), and bringing an actual rotational speed difference, between the first and the second shifting element halves (A6, A7) of the first interlocking shifting element (A) into a speed difference window, within which the first interlocking shifting element (A) is changeable to the engaged operating condition, and engaging the first interlocking shifting element (A), when the actual rotational speed difference is within the speed difference window, to produce the force flow in the transmission (3).

2. The method according to claim 1, further comprising the step of changing an initial condition of a frictional shifting element (D), that must be engaged to produce the force flow in the transmission (3), to an engaged operating condition, before beginning motor action in the internal combustion engine (2).

3. The method according to claim 2, further comprising the step of, if there is a negative speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, increasing the speed (n_2) of the internal combustion engine (2) until the speed difference is within the speed difference window.

4. The method according to claim 1, further comprising the step of, if there is a positive speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, reducing the speed (n_2) of the internal combustion engine (2) until the speed difference is within the speed difference window.

5. The method according to claim 4, further comprising the step of, if there is a negative speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, increasing the speed (n_2) of the internal combustion engine (2) until the speed difference is within the speed difference window.

6. The method according to claim 2, further comprising the step of, if there is a positive speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, reducing the speed (n_2) of the internal combustion engine (2) until the speed difference is within the speed difference window.

7. The method according to claim 6, further comprising the step of, if there is a negative speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, increasing the speed (n_2) of the internal combustion engine (2) until the speed difference is within the speed difference window.

8. The method according to claim 1, further comprising the step of, if there is a negative speed difference, between the speed (n_A6) of the first interlocking shifting element half (A6) of the first interlocking shifting element (A) on the transmission input side and the speed (n_A7) of the second interlocking shifting element half (A7) on the transmission output side, which is outside the speed difference window, increasing the speed (n_2) of the internal combustion engine (2) until the speed difference is within the speed difference window.

9. The method according to claim 1, further comprising the steps of:
    determining the actual rotational speed difference between the rotational speed of the first interlocking shift element half (A6) and the second interlocking shift element half (A7) of the first interlocking shift element (A); and
    altering the rotational speed (n_A6) of the first interlocking shifting element half (A6) based on the actual rotational speed difference between the rotational speed of the first interlocking shift element half (A6) and the second interlocking shift element half (A7) of the first interlocking shift element (A) and the speed difference window, within which the first interlocking shifting element (A) is changeable to the engaged operating condition.

10. The method according to claim 1, further comprising the steps of:
    maintaining the second interlocking shifting element (F) in the engaged condition during a reverse operating condition ("R") of the transmission (3); and
    maintaining the second interlocking shifting element (F) in the engaged condition during at least the first three consecutive forward gear ratio steps ("1", "2", "3") of the transmission (3).

11. The method according to claim 1, further comprising the steps of:
    maintaining the second interlocking shifting element (F) in the engaged condition during a reverse operating condition ("R") of the transmission (3); and
    maintaining the second interlocking shifting element (F) in the engaged condition during at least the first three consecutive forward gear ratio steps ("1", "2", "3") of the transmission (3).

12. The method according to claim 1, further comprising the step of:
    forming the transmission to be a nine-speed transmission (3) which has at least nine forward gears, a neutral gear and a reverse gear.

13. A method for operating a vehicle drive-train (1) which comprises an internal combustion engine (2) and a nine-speed transmission (3), having at least nine forward gears, a neutral gear and a reverse gear, the transmission (3) having which has a transmission input shaft (6) that is functionally connected to the internal combustion engine (2), a first interlocking shift element (F), and a second interlocking shift element (A) having first and second interlocking shift element halves (A6, A7), the first interlocking shift element half (A6) of the second interlocking shift element (A) is directly connected to the transmission input shaft (6) and the second interlocking shift element half (A7) is functionally connected to a transmission output shaft (7), the method comprising the steps of:
    operating the transmission in a neutral operating condition ("N") in which:
        the first interlocking shift element (F) is engaged, and
        the second interlocking shift element (A) is disengaged so as to interrupt a force flow in the transmission (3);
    initiating a shift from the neutral operating condition ("N") to a drive operating condition in which the force flow in the transmission (3) is produced by:
        determining an actual rotational speed difference between a rotational speed of the first interlocking shift element half (A6) and the second interlocking shift element half (A7) of the second interlocking shift element (A);
        comparing the actual rotational speed difference to a range of rotational speed differences; and
        adjusting a rotational speed (n_2) of the internal combustion engine (2), if the actual rotational speed difference is not within the range of rotational speed differences, to adjust the actual rotational speed difference to be within the range of rotational speed differences; and
    engaging the second interlocking shift element (A) when the actual rotational speed difference is within the range of rotational speed differences to produce the force flow in the transmission (3).

14. The method according to claim 13, further comprising the step of engaging a frictional shifting element (D), that must be engaged to produce the force flow in the transmission (3), before beginning adjustment of the rotational speed (n_2) of the internal combustion engine (2).

15. A method of operating a vehicle drive-train (1) which comprises an internal combustion engine (2) functionally connected to a nine-speed transmission (3) having at least nine forward gears, a neutral gear and a reverse gear, the transmission (3) having an input shaft, the method comprising the steps of:

operating the transmission in a neutral operating condition ("N") and interrupting a force flow in the transmission by:

interlocking first and second interlocking halves of a first interlocking shift element (F) of the transmission and thereby engaging the first interlocking shift element (F) in the transmission;

functionally connecting a first interlocking half (A6) of a second interlocking shift element (A) to the input shaft (6);

functionally connecting a second interlocking half (A6) of the second interlocking shift element (A) to an output shaft (7) of the transmission; and disengaging the first and the second interlocking halves (A6, A7) of the second interlocking shift element (A);

initiating shifting from the neutral operating condition ("N") to a drive operating condition (R, "1"-"9") by:

maintaining interlocking engagement of first and second interlocking halves of the first interlocking shift element (F);

determining an actual rotational speed difference between a rotational speed (n_6) of the first interlocking half (A6) of the second interlocking shift element (A) and a rotational speed (n_7) of the second interlocking half (A7) of the second interlocking shift element (A);

comparing the actual rotational speed difference to a range of rotational speed differences;

adjusting a rotational speed (n_2) of the internal combustion engine (2) so as to adjust the rotational speed (n_6) of the first half (A6) of the second interlocking shift element (A);

bringing the actual rotational speed difference to be within the range of rotational speed differences; and interlocking the first and the second interlocking halves of the second interlocking shift element (A), when the actual rotational speed difference is within the range of rotational speed differences, thereby engaging the second interlocking shift element (A) in the transmission; and operating the transmission in the drive operating condition (R, "1"-"9") in which the first interlocking shift element (F) and the second interlocking shift element (A) are engaged.

16. The method according to claim 15, further comprising the steps of:

maintaining the second interlocking shifting element (F) in the engaged condition during a reverse operating condition ("R") of the transmission (3); and maintaining the second interlocking shifting element (F) in the engaged condition during at least the first three consecutive forward gear ratio steps ("1", "2", "3") of the transmission (3).

17. The method according to claim 15, further comprising the step of:

maintaining the second interlocking shift element (A) in the engaged condition in at least three consecutive forward gear ratio steps ("1", "2", "3", "5", "6" "7") of a forward drive operating condition of the transmission (3).

* * * * *